Patented Oct. 5, 1943

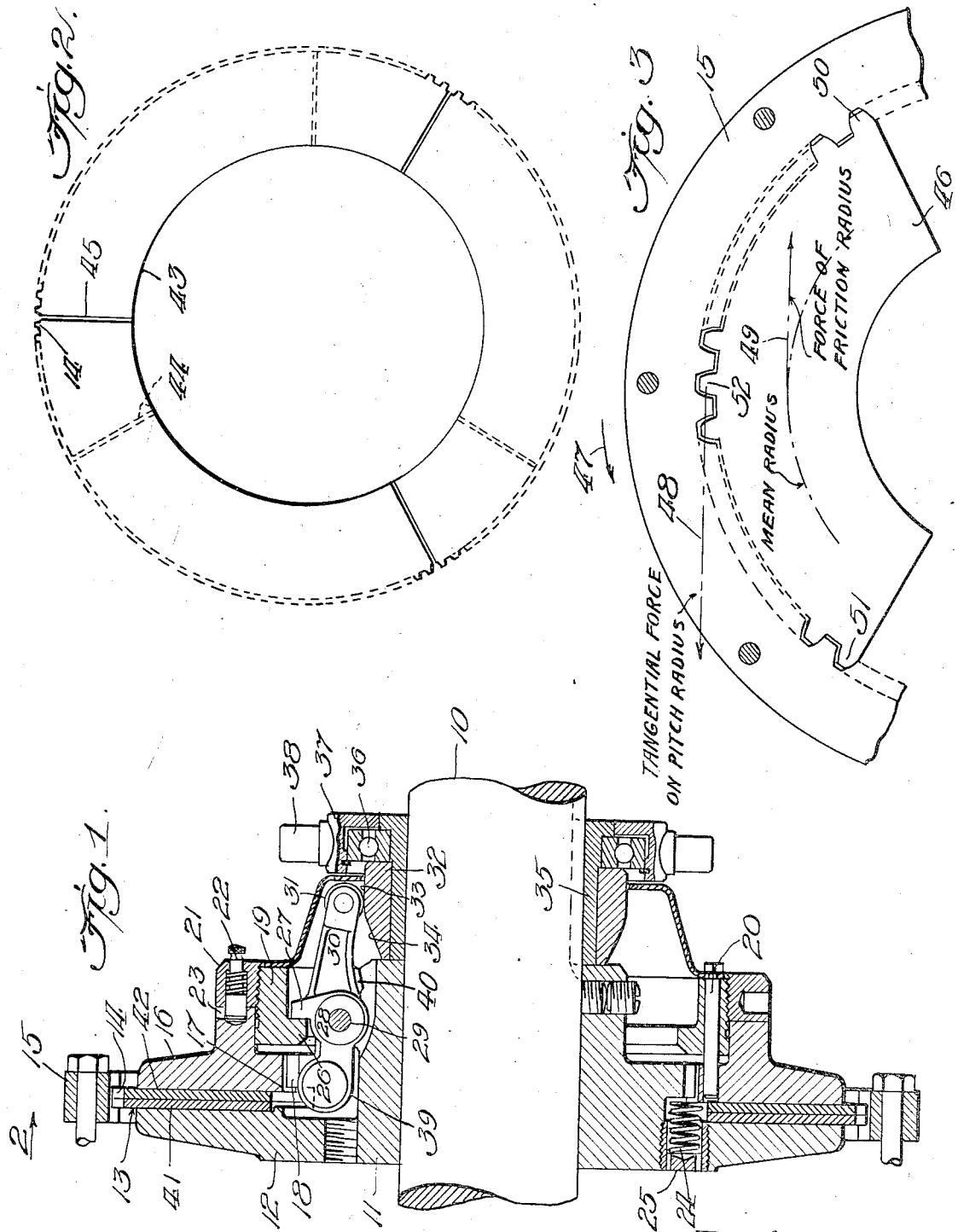

2,330,856

UNITED STATES PATENT OFFICE 2,330,856

FRICTION CLUTCH

Nicholas F. Adamson, Racine, Wis., assignor to Twin Disc Clutch Company, Racine, Wis., a corporation of Wisconsin Application March 12, 1942, Serial No. 434,412

11 Claims. (Cl. 192—68)

My invention relates to friction clutches of the type in which the driving plate is connected to the driving ring by a spline or tooth connection.

In such clutches, the toothed connection provides a certain flexibility that may compensate for the additive effects of assembly tolerances and permits a slight misalignment between the driving and driven shafts. However, this construction is characterized by an objectionable rattling noise arising from the backlash between the driving ring and plate and the resulting capacity for relative movement of these parts when running under light load or no load with the clutch engaged. This relative movement is believed to be due to the torsional vibrations transmitted through the clutch to the driven member, such as a propeller shaft and propeller assembly.

As a solution of this problem, it has heretofore been proposed (see United States Letters Patent to Rosner, No. 1,518,604, dated December 9, 1924) to split the driving plate into a plurality of segments. The theory of this construction is that the segments will be moved radially outward by centrifugal force to wedge the teeth of the plate and the driving ring and so stop the noise.

The splitting of the driving plate, however, has created a distinct problem in certain installations, such as the so-called sailing clutches which are connected to slow speed, oil burning engines as commonly used in fishing, work and tow boats. These engines are of heavy construction when compared with high speed gasoline engines and when operating at reduced speed for a considerable period, their action is quite rough and sets up torsional vibrations of large magnitude. Driving plates for such clutches in the larger sizes have a diameter from 30" to 42" so that the clatter is of serious importance.

It is believed that the noise is due to the fact that the segments do not move in true radial directions, but, on the contrary, when the clutch is engaged, each segment is rocked or displaced within the backlash limits in a plane transverse to the clutch axis. This rocking is due to the couple applied to each segment and composed of the tangential loading of the driving ring at the periphery of the segment and the loading of the clamping members of the clutch which is applied at the mean radius of each segment. The result is that only a few of the teeth of each segment have full bearing on the teeth of the driving ring, while the remaining teeth have no or a very limited bearing. The segments are therefore able to move under the impulse of torsional vibrations and become noisy.

It is therefore one object of my invention to devise a friction clutch of the toothed driving type having a segmental driving plate which is constructed and arranged to transmit power at all speeds and loads with a minimum of noise.

A further object is to provide a clutch of the character indicated in which the teeth of the plate segments have a more uniform bearing on the teeth of the driving ring when the clutch is engaged.

A further object is to devise a clutch driving plate composed of a plurality of segments in which the latter are arranged to mutually oppose any tendency when the clutch is engaged to be shifted to positions in which the teeth are not uniformly contacted with the teeth of the driving ring.

These and further objects of my invention will be set forth in the following specification, reference being had to the accompanying drawing, and the novel means by which said objects are effectuated will be definitely pointed out in the claims.

In the drawing:

Fig. 1 is a sectional elevation of a typical clutch equipped with my improved driving plate.

Fig. 2 is an elevation of the driving plate looking in the direction of the arrow 2 in Fig. 1.

Fig. 3 is a diagrammatic view showing the rocked or displaced position assumed by a segment of a prior art driving plate.

Referring to Fig. 1, the numeral 10 designates a shaft constituting one of the rotary parts which are interconnected by the clutch and which, for purpose of illustration, will be regarded as being driven, although the conditions of operation may be reversed as to this particular. Keyed or otherwise secured for rotation with the shaft 10 is a hub 11 having preferably formed integrally therewith an annular flange that functions as a clamping plate 12 and which engages with one face of a friction driving member 13 whose periphery is provided with a plurality of teeth 14, or generally splined, for driving engagement with a driving ring 15 that may be bolted or otherwise secured to a flywheel or other rotary part.

A second clamping plate 16 engages the opposite face of the member 13 and is provided with internal teeth 17 that mesh with similar teeth 18 disposed externally around the hub 11. Accordingly, the plate 16 is capable of moving axially relative to the hub 11 and clamping plate 12, while partaking of the rotary motion of these elements.

The plate 16 is counterbored to receive an adjusting ring 19 that fits closely in the bore and is rotatably secured to the plate 16 by a series of circumferentially spaced pins 20. A portion of the ring 19 projects beyond the exposed side of the plate 16 to threadingly receive in encircling relation thereto an adjusting nut 21 whose inner face abuts the plate 16. Since the ring 19 is held against rotation relative to the plate 16 and is also held against movement toward the right as viewed in Fig. 1 by the clutch levers as hereinafter described, it will be obvious that the rotation of the nut 21 will effect an endwise movement of the plate 16. Accordingly, this nut provides a means for adjusting the plate 16 from time to time to compensate for the wear of the driving member 13. The adjusted position of the nut 21 is maintained by means of an index pin 22 that is reciprocable through the nut 21 and the inner end of this pin is received in any one of a plurality of depressions or sockets 23 that are circumferentially spaced around the face of the plate 16.

In order to assist in the separation of the clamping plates and driving member from each other when the clutch is released, a plurality of coil springs 24 are mounted in appropriate pockets provided in the hub 11, the inner end of each spring abutting against the plate 16 and the opposite end against the closed end of a sleeve 25 that is threaded in the pocket.

The adjusting ring 19 is provided with an internal, annular flange 26 that is engaged by an arm 27 provided on a clutch lever 28 that is pivotally mounted on a pin 29 extending between appropriate lugs provided on the hub 11. As many of the clutch levers 28 may be employed as desired and they are preferably equi-spaced circumferentially around the hub.

A second lever arm 30 is provided on each clutch lever and it extends toward the right, as viewed in Fig. 1, from the pivot pin 29 in a direction generally parallel to the axis of the shaft 10 and at its extremity pivotally carries a roller 31 which rides on the lateral surface of the collar 32 having the cylindrical and conical surface portions 33 and 34, respectively. The collar 32 is mounted on a sleeve 35 that is keyed or otherwise splinedly connected to the shaft 10 in order to partake of the rotary motion thereof, while permitting the endwise shifting of the sleeve 35 along the shaft. The collar 32 is tightly fitted on the sleeve 35, or is otherwise securely attached thereto so as to rotarily move with the sleeve, and the inner race of a ball bearing 36 encircles the sleeve between a shoulder formed thereon and the adjacent end of the collar 32. The outer race of this bearing is received within a collar 37 provided with the usual trunnions 38 for engaging with a shifting fork (not shown).

Extending in the opposite direction from each lever arm 30 in a direction generally parallel to the axis of the shaft 10 and forming a part of each clutch lever is a third arm 39 which is weighted so as to overbalance the arm 30. Hence, when free to act, this counterbalanced arm of each lever will effect a clockwise rotation thereof under the impulse of centrifugal force.

So far as described, the clutch is identical with that disclosed in United States Letters Patent, No. 2,077,709, dated April 20, 1937, to which reference may be made for further details of construction. This patent has been selected as showing a clutch provided with a typical, segmental driving plate, but the only portions thereof which are important so far as the present invention is concerned are the driving member 13, driving ring 15, and the clamping plates 12 and 16.

The operation of the clutch is more or less obvious from the foregoing description. In Fig. 1, the clutch is shown in driving position and when the sleeve 35 is moved toward the right, the roller 31 of each lever rides down the conical surface 34 due to centrifugal force operating on the counterbalanced arms 39. This releasing movement of the levers withdraws the short arms 27 from contact with the flange 26 on the adjusting ring 19, so that the clamping plates and driving member are then free to release themselves and this action is assisted by the extending movement of the springs 24.

The releasing movement of the levers is limited by a boss 40 provided on the under or inner side of each arm 30 which contacts with the adjacent surface of the clutch hub, and the height of these bosses is such that the peripheries of the rollers 31 will always occupy positions when the clutch is released from which they can ride outwardly along the conical surface 34 when the clutch is reengaged by a shifting of the sleeve 35 to the position indicated in Fig. 1.

The clutch as shown in Fig. 1 differs from that disclosed in Patent No. 2,077,709 in the construction of the driving member 13, corresponding to the driving plate of the patent, and the present invention relates more particularly to this member as part of a clutch and also to a clutch embodying the member. As in the patented clutch, the member 13 is of segmental construction but instead of being composed of a single plate cut into a plurality of segments, from two to any desired number, the member is composed of a pair of abutting plates 41 and 42, each of which is cut into a plurality of segments. Each segment may be of parti-annular shape 43 with its outer periphery toothed or splined as at 14 and the segments of each group are located in the same plane. Two such plates are shown in Fig. 1, but this number may be varied as desired. For reasons presently noted, the segments in one plate are disposed asymmetrical with respect to the segments in the abutting plate, i. e., the end edges 44 of the segments in the plate 41 are circumferentially spaced relative to the end edges 45 of the segments in the plate 42. The invention contemplates any spacing of these end edges between the limiting positions in which the edges are aligned. In one installation, a spacing of the order of thirty degrees was found to be satisfactory and this spacing is illustrated in Fig. 2.

The advantages of my construction can be understood by reference to Fig. 3 which shows, in diagrammatic relation to the driving ring 15, one segment 46 of a driving plate of the type disclosed in any of the above patents. If it is assumed that the ring is rotating in the direction of the arrow 47, then, when the clutch is engaged, the resultant of the forces exerted by the teeth of the ring on the teeth of the segment may be represented by the arrow 48 located at the pitch radius of the teeth, while the resultant of the reaction forces set up by the frictional resistance of the clamping plates of the clutch may be represented by the arrow 49 acting at the mean radius of the segment. These resultants not only act in opposite directions, as indicated, but they are located at different radial distances from the axis of the clutch. Hence, each segment is subjected to a couple which tends to rock or displace the same in a counterclockwise direction, as viewed in Fig. 3, so that the segment is not free to move in a true radial direction under the impulse of centrifugal force.

The displaced position assumed by each segment is shown in Fig. 3 which illustrates, in relation to the teeth of the driving ring 15, the trailing teeth 50 (considered from the standpoint of the direction of rotation), the leading teeth 51 and intermediate teeth 52 of the segment. It will be observed that both flanks of the trailing teeth 50 have full bearing on the ring teeth, that only the leading flanks of the leading teeth 51 bear on the ring teeth, while the intermediate teeth 52 do not bear at all on the ring teeth. Bearing conditions of teeth in other locations than those discussed will vary slightly from the selected teeth, dependent upon location. Hence, the situation is such that the teeth of the segment are capable of moving and, when subjected to torsional vibrations, do move and become noisy.

My arrangement of the member 13 as a built-up unit of axially displaced, asymmetrical groups of segments completely solves the above problem. When the segments are made of a material, such as molded asbestos, which is generally characterized by a higher coefficient of friction than the clamping plates 12 and 16, ordinarily composed of metal, such as cast iron, I have ascertained that the tendency of any segment to rock is resisted by friction set up with the abutting segment, so that the force couple acting on one segment is substantially neutralized by the force couple acting on the abutting segment.

Accordingly, the segments are freer to assume the desired positions in which their teeth closely fit the teeth of the driving ring when the clutch is accelerating the load. A cardinal feature of the invention resides in the fact that the segments are restrained against displacement by the force of friction between the plates, which force completely disappears when the clutch is released so that the driving member 13 and its component parts are free to assume non-driving positions between the clamping plates 12 and 16.

I claim:

1. In a power transmitting device, the combination of an externally toothed member and an internally toothed member having driving connection with each other, the first named member comprising two abutting groups of segments, the end edges of the segments in one group being circumferentially spaced from the end edges of the other segments and the segments being arranged to utilize centrifugal force in taking up play in the toothed connection.

2. In a power transmitting device, the combination of two members, one encircling and having a toothed driving connection with the other, the driven member comprising axially displaced groups of segments, segments in adjacent groups abutting and being circumferentially displaced relative to each other and the segments being radially movable under the impulse of centrifugal force.

3. In a power transmitting device, the combination of inner and outer members having a toothed driving connection with each other, the inner member comprising axially displaced groups of segments, segments in adjacent groups abutting and being circumferentially displaced relative to each other and the segments being radially movable under the impulse of centrifugal force.

4. In a power transmitting device, the combination of two members, one encircling and having a toothed driving connection with the other, the inner member comprising a plurality of segments disposed in different planes and adapted to be abuttingly gripped together for power transmission, the segments in one plane being circumferentially displaced relative to the segments in an adjacent plane and all of the segments being radially movable.

5. In a power transmitting device, the combination of an outer member and an inner member connected together for rotary transmission of power and arranged for relative axial movement, the inner member comprising axially displaced groups of segments, segments in adjacent groups abutting and being circumferentially displaced relative to each other and the segments being radially movable under the impulse of centrifugal force.

6. In a clutch, the combination of an internally toothed driving ring, a peripherally toothed driving member meshing with the ring, and clamping means engaging the member to transmit power through the clutch, the member comprising axially displaced groups of segments, segments in adjacent groups abutting and being circumferentially displaced relative to each other and the segments being radially movable under the impulse of centrifugal force.

7. In a clutch, the combination of an internally toothed driving ring, a peripherally toothed driving member meshing with the ring, and clamping means engaging the member to transmit power through the clutch, the member comprising axially displaced groups of segments composed of a material having a higher coefficient of friction than the clamping means, segments in adjacent groups abutting and being circumferentially displaced relative to each other and the segments being radially movable under the impulse of centrifugal force.

8. In a clutch, the combination of an internally toothed driving ring, a peripherally toothed driving member meshing with the ring, and metallic clamping means engaging the member to transmit power through the clutch, the member comprising axially displaced groups of segments composed of asbestos having a higher coefficient of friction than the clamping means, segments in adjacent groups abutting and being circumferentially displaced relative to each other and the segments being radially movable under the impulse of centrifugal force.

9. A driving plate for a clutch comprising a plurality of radially movable and peripherally toothed segments arranged in abutting groups lying in different planes, the end edges of the segments in one group lying between the end edges of the segments in an adjacent group.

10. A driving plate for a clutch comprising a plurality of abutting groups each including unconnected, peripherally toothed, parti-annular and equi-spaced parts, the end edges of the parts in one group lying between the end edges of the parts in an adjacent group.

11. A driving plate for a clutch comprising a plurality of radially movable and peripherally toothed segments composed of asbestos arranged in abutting groups lying in different planes, the end edges of the segments in one group lying between the end edges of the segments in an adjacent group.

NICHOLAS F. ADAMSON.